(12) United States Patent
Tochioka et al.

(10) Patent No.: US 10,668,929 B2
(45) Date of Patent: Jun. 2, 2020

(54) METHOD AND SYSTEM OF ASSISTING DRIVING OF VEHICLE

(71) Applicant: Mazda Motor Corporation, Aki-gun, Hiroshima (JP)

(72) Inventors: Takahiro Tochioka, Higashihiroshima (JP); Seiji Goto, Hiroshima (JP); Hideki Okano, Aki-gun (JP); Kazuhiro Ikeda, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 209 days.

(21) Appl. No.: 15/904,851

(22) Filed: Feb. 26, 2018

(65) Prior Publication Data
US 2018/0281812 A1 Oct. 4, 2018

(30) Foreign Application Priority Data
Mar. 29, 2017 (JP) ................. 2017-065085

(51) Int. Cl.
*B60W 40/09* (2012.01)
*B60W 30/02* (2012.01)
*B60W 50/00* (2006.01)

(52) U.S. Cl.
CPC .......... *B60W 40/09* (2013.01); *B60W 30/025* (2013.01); *B60W 50/0098* (2013.01); *B60W 2050/0029* (2013.01); *B60W 2050/0088* (2013.01); *B60W 2540/043* (2020.02)

(58) Field of Classification Search
CPC ........... B60W 50/0098; B60W 30/025; B60W 40/09; B60W 2050/0088; B60W 2540/043; B60W 2050/0029
See application file for complete search history.

(56) References Cited

U.S. PATENT DOCUMENTS

| 9,625,266 | B1 * | 4/2017 | Chintakindi | ....... G01C 21/3691 |
| 10,475,127 | B1 * | 11/2019 | Potter | .................... G06Q 40/08 |
| 2007/0124027 | A1 * | 5/2007 | Betzitza | ................ B60W 40/02 |
| | | | | 701/1 |

(Continued)

FOREIGN PATENT DOCUMENTS

| JP | 2009237937 A | 10/2009 |
| JP | 2015135552 A | 7/2015 |

*Primary Examiner* — Mussa A Shaawat
(74) *Attorney, Agent, or Firm* — Alleman Hall Creasman & Tuttle LLP

(57) ABSTRACT

A vehicle drive assistance system is provided, which includes one or more processors configured to execute a general driver model learning engine configured to build a general driver model to be applied to a plurality of drivers based on driving data of the drivers, an individual driver model learning engine configured to build an individual driver model unique to a specific driver based on driving data of the driver, and an on-board controller provided in a vehicle operated by the driver. The individual driver model learning engine includes a vehicle control updating program configured to cause the on-board controller to update vehicle control processing based on the general and individual driver models. The vehicle control updating program acquires the driver models and, according to a given condition, determines a driver model based on which the vehicle control processing is updated, between the general and individual driver models.

5 Claims, 8 Drawing Sheets

(56) References Cited

U.S. PATENT DOCUMENTS

| | | | |
|---|---|---|---|
| 2008/0084283 A1* | 4/2008 | Kalik | B60Q 9/00 340/435 |
| 2008/0105482 A1* | 5/2008 | Yamaguchi | G05B 15/02 180/271 |
| 2011/0169625 A1* | 7/2011 | James | B60Q 9/008 340/439 |
| 2015/0199617 A1 | 7/2015 | Kuwajima | |
| 2016/0059775 A1* | 3/2016 | Gorse | G01S 19/13 701/468 |
| 2016/0216130 A1* | 7/2016 | Abramson | G01C 21/3626 |
| 2017/0166217 A1* | 6/2017 | Sbianchi | A61B 5/18 |
| 2017/0279957 A1* | 9/2017 | Abramson et al. | H04M 1/72577 |
| 2017/0297564 A1* | 10/2017 | Xi | B60W 30/025 |
| 2018/0025430 A1* | 1/2018 | Perl | B60R 16/0231 705/4 |
| 2018/0047107 A1* | 2/2018 | Perl | G06N 5/02 |
| 2018/0174457 A1* | 6/2018 | Taylor | G06N 3/0454 |
| 2018/0274934 A1* | 9/2018 | Agrawal | B29C 61/003 |

* cited by examiner

METHOD AND SYSTEM OF ASSISTING
DRIVING OF VEHICLE

TECHNICAL FIELD

The present disclosure relates to a method and system of assisting driving of a vehicle, and particularly to a method and system of assisting driving of a vehicle by using a driver model.

BACKGROUND OF THE DISCLOSURE

Recently, a driver model is proposed to be used for assisting a vehicle control. For example, JP2009-237937A discloses a driver model processor which uses driver models particularly regarding driving operations. The driver models include an individual driver model created for a particular vehicle and an optimal driver model created based on data of a large number of vehicles by a driver model server disposed outside the vehicle. In this processor, when the individual driver model is different from the optimal driver model, a vehicle driver is given advice based on this difference.

Further, learning systems for vehicles are proposed. For example, JP2015-135552A discloses a learning system that transmits data used for image recognition processing from a vehicle to a learning server, and the learning server performs learning processing by using this data. Thus, update data of a parameter used for the image recognition processing is generated and the parameter is updated with the update data in the vehicle.

In view of securing a suitable vehicle control, it is preferable that vehicle control processing is consecutively updatable based on learning in an external machine learning system as described in JP2015-135552A. It is particularly preferable if the vehicle control processing is updatable so as to match with driving characteristics of an individual driver. However, since an emotional state of the driver is not constant, fixed vehicle control processing is not always suitable for the driver if his/her emotional state changes. However, for example, if an unexpected extreme operation is repeated, because of the vehicle control processing being updated accordingly, negative influences may occur, such as a performance degradation of the vehicle in an early stage and an increase of driver fatigue.

SUMMARY OF THE DISCLOSURE

The present disclosure is made in view of solving the issues described above, and aims to provide a method and system of assisting driving of a vehicle, in which vehicle control processing is updated more suitably based on learning in an external machine learning system.

According to one aspect of the present disclosure, a vehicle drive assistance system is provided, which includes one or more processors configured to execute a general driver model learning engine configured to build a general driver model to be applied to a plurality of vehicle drivers based on driving data of the plurality of drivers, and an individual driver model learning engine configured to build an individual driver model unique to a specific vehicle driver based on driving data of the specific driver, and an on-board controller provided in a vehicle operated by the specific driver and configured to perform particular vehicle control processing. The individual driver model learning engine includes a vehicle control updating engine configured to cause the on-board controller to update the vehicle control processing based on the general driver model and the individual driver model. The vehicle control updating engine acquires the general driver model and the individual driver model and, according to a given condition, determines a driver model based on which the vehicle control processing is updated, between the general driver model and the individual driver model.

With this configuration, a suitable model is selected from the general driver model and the individual driver model according to the given condition, and the vehicle control processing that is performed in the vehicle is updated based on the selected model. The individual driver model is built based on the driving data of the specific driver of the vehicle, while on the other hand, the general driver model is built based on the driving data of the plurality of drivers. Therefore, by selecting one of the general driver model and the individual driver model according to the given condition, the vehicle control processing is updated more suitably.

The vehicle control updating program may determine a difference between the general driver model and the individual driver model, and when the difference is above a given threshold, the vehicle control processing may be updated based on the general driver model.

With the configuration, when the difference between the general driver model and the individual driver model is above the given threshold, since there is a possibility of the individual driver model being generated due to repetition of the extreme driving operation, the vehicle control processing is updated based on the general driver model. Thus, a risk of a decrease in safety of the vehicle is reduced.

The individual driver model learning engine may include a driver state analyzing program configured to analyze a current state of the specific driver based on the driving data of the specific driver. When the driver state analyzed by the driver state analyzing unit is not changed to a given state after the vehicle control processing is updated based on the individual driver model, the vehicle control updating program may update the vehicle control processing based on the general driver model.

With the configuration, although the vehicle control processing is updated based on the individual driver model, if the driver state is not improved (e.g., an emotional state is not changed from tensed to relaxed), the vehicle control processing is updated again based on the general driver model.

The vehicle control updating program may prioritize the update of the vehicle control processing based on the individual driver model than the update of the vehicle control processing based on the general driver model.

Since the individual driver model reflects the characteristics of the specific driver more than the general driver model, it is preferable to update the vehicle control processing according to the individual driver model.

According to another aspect of the present disclosure, a method of assisting driving of a vehicle by a vehicle drive assistance system is provided. The system includes one or more processors configured to execute a general driver model learning engine configured to build a general driver model to be applied for a plurality of vehicle drivers based on driving data of the plurality of drivers, and an individual driver model learning engine configured to build an individual driver model unique to a specific vehicle driver based on driving data of the specific driver, and an on-board controller provided in a vehicle operated by the specific driver and configured to perform particular vehicle control processing. The method includes causing the individual driver model learning engine to acquire the general driver model from the general driver model learning engine, acquire a control parameter of the vehicle control processing from the on-board controller, acquire from the individual driver model an individual driver model parameter corresponding to the acquired control parameter, acquire from the general driver model a general driver model parameter corresponding to the acquired control parameter, calculate a difference between the individual driver model parameter and the general driver model parameter, calculate an update parameter for the control parameter based on the individual driver model parameter when the difference is smaller than a given value, calculate an update parameter for the control parameter based on the general driver model parameter when the difference is larger than the given value, and transmit to the on-board controller an instruction for updating the control parameter to the update parameter.

According to still another aspect of the present disclosure, a method of assisting driving of a vehicle by a vehicle drive assistance system is provided. The system includes one or more processors configured to execute a general driver model learning engine configured to build a general driver model to be applied for a plurality of vehicle drivers based on driving data of the plurality of drivers, and an individual driver model learning engine configured to build an individual driver model unique to a specific vehicle driver based on driving data of the specific driver, and an on-board controller provided in a vehicle operated by the specific driver and configured to perform particular vehicle control processing. The method includes causing a driver state analyzing program to analyze a current emotional state of the driver based on the driving data of the specific driver, causing the individual driver model learning engine to acquire a control parameter of the vehicle control processing from the on-board controller, causing the individual driver model learning engine to acquire from the individual driver model an individual driver model parameter corresponding to the acquired control parameter, causing the individual driver model learning engine to calculate an update parameter for the control parameter based on the individual driver model parameter, causing the individual driver model learning engine to transmit to the on-board controller an instruction for updating the control parameter to the update parameter, causing the on-board controller to update the control parameter to the update parameter, causing the driver state analyzing program to analyze the emotional state of the driver based on the driving data of the specific driver after the update, causing the individual driver model learning engine to acquire a general driver model parameter corresponding to the updated control parameter from the general driver model when the driver emotional state analyzed by the driver state analyzing program is not changed to a given state after the update, causing the individual driver model learning engine to calculate an update parameter for the updated control parameter based on the general driver model parameter, and causing the individual driver model learning engine to transmit to the on-board controller an instruction for updating the updated control parameter to the update parameter calculated based on the general driver model parameter.

DETAILED DESCRIPTION OF THE DISCLOSURE

Figure 1:
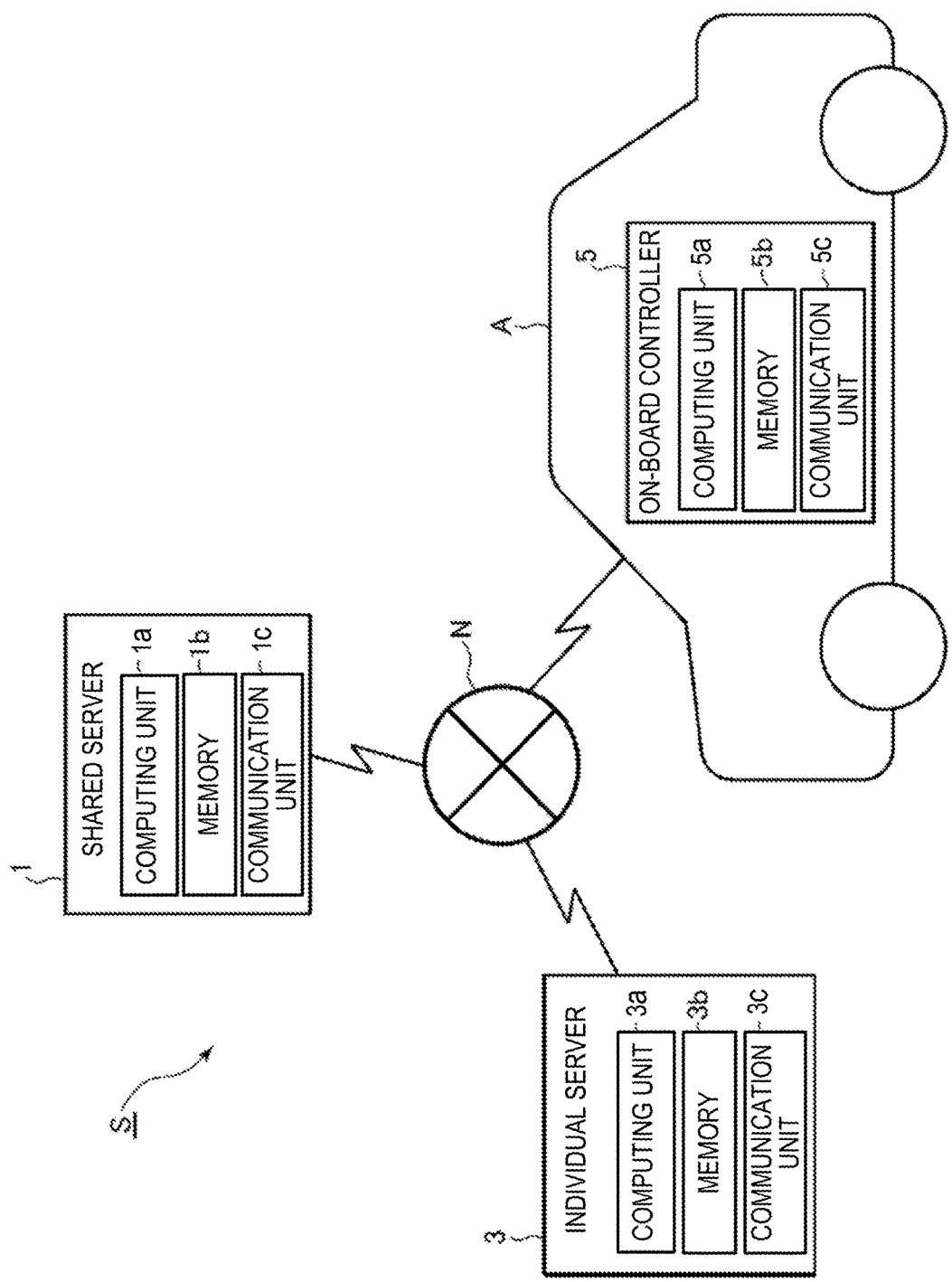
FIG. 1 is a configuration view of a vehicle drive assistance system according to one embodiment of the present disclosure.
Figure 2:
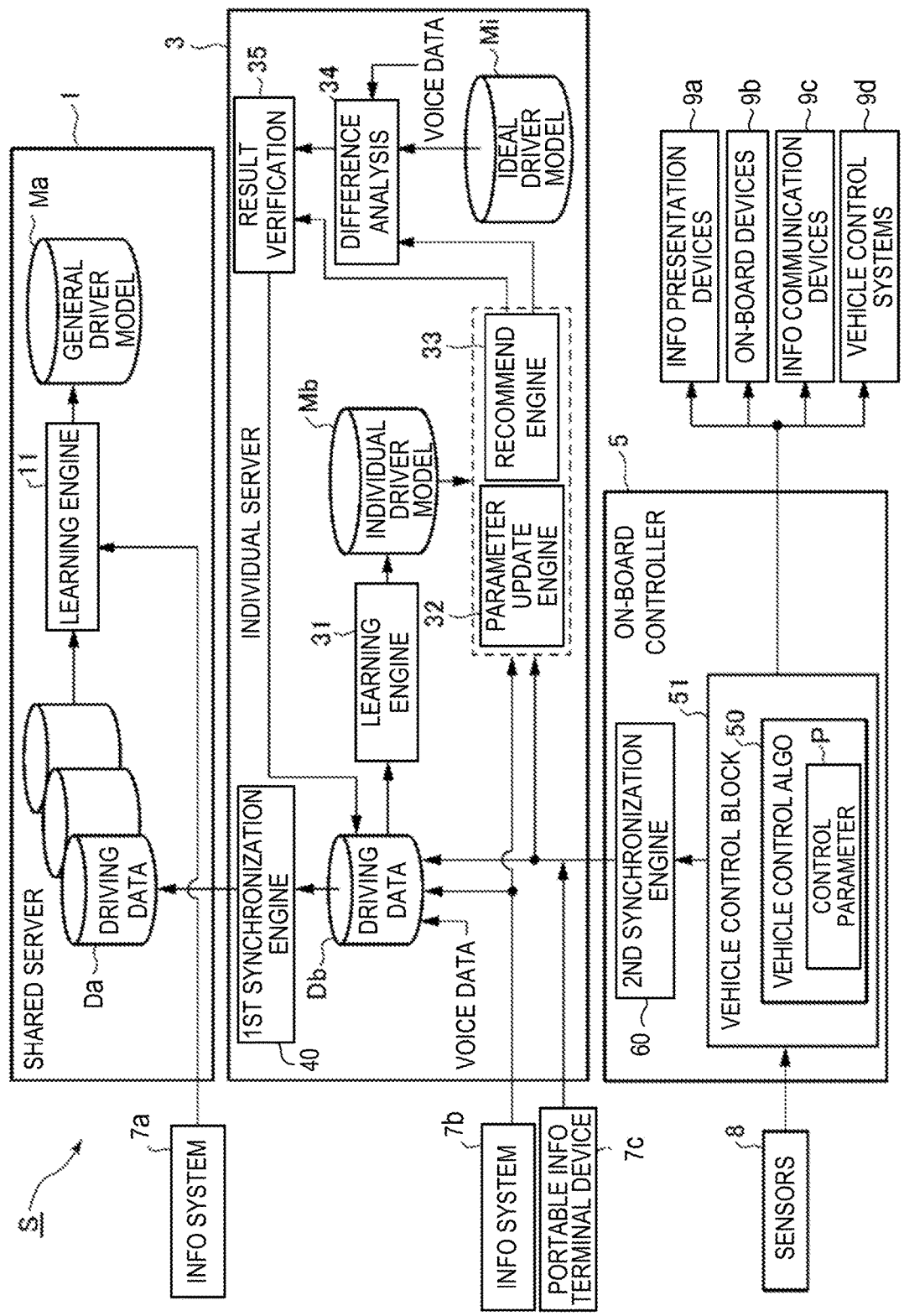
FIG. 2 is a functional block diagram of various components of the vehicle drive assistance system according to the embodiment of the present disclosure.
Figure 3:
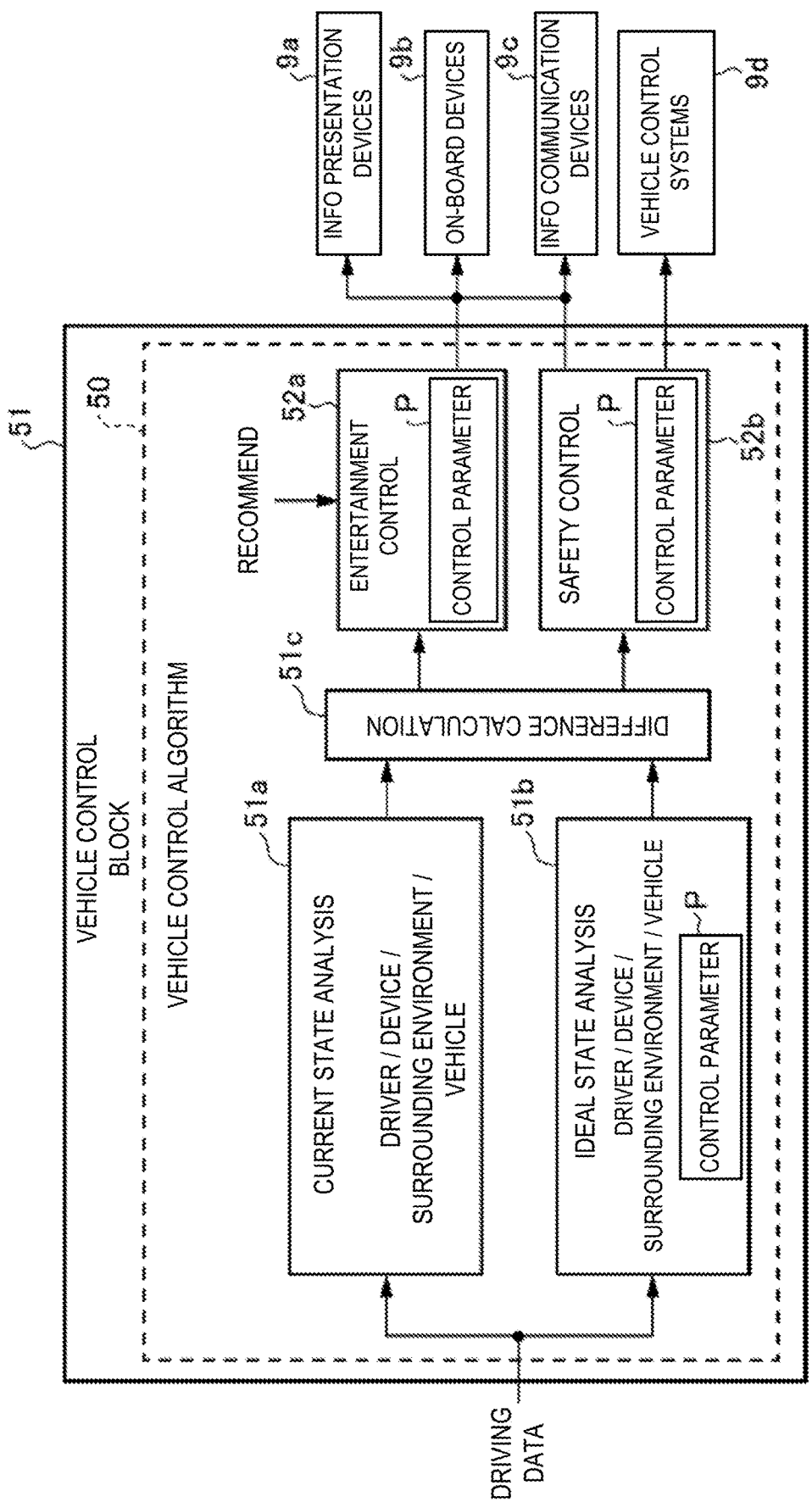
FIG. 3 is a functional block diagram of the inside of a vehicle control block in a vehicle according to the embodiment of the present disclosure.

Hereinafter, a vehicle drive assistance system according to one embodiment of the present disclosure is described with reference to the accompanying drawings. First, a configuration of the vehicle drive assistance system is described with reference to FIGS. 1 to 3. FIG. 1 is a configuration view of the vehicle drive assistance system, FIG. 2 is a functional block diagram of various components of the vehicle drive assistance system, and FIG. 3 is a functional block diagram of the inside of a vehicle control block in a vehicle.

As illustrated in FIG. 1, a vehicle drive assistance system S includes a shared server 1, an individual server 3, and an on-board controller 5 (ECU (Electronic Control Unit)) which is disposed in a vehicle A. They are communicably connected to each other by a wireless or wired communication line N.

Each of the shared server 1 and the individual server 3 is a computer system constituting artificial intelligence, and builds and consecutively updates a general driver model and an individual driver model. As used herein, "build" includes developing and training the model. The shared server 1 includes a computing unit 1a (processor), memory 1b, a communication unit 1c, etc. Similarly, the individual server 3 includes a computing unit 3a (processor), memory 3b, a communication unit 3c, etc.

Similarly, the on-board controller 5 includes a computing unit 5a (processor), memory 5b, a communication unit 5c, etc. The on-board controller 5 performs vehicle control processing of the vehicle A. The vehicle control processing includes drive control processing and drive assistance processing.

As illustrated in FIG. 2, in the shared server 1, a learning engine 11 (i.e., a general driver model learning engine executed by the computing unit 1a) comprised of artificial intelligence learns driving data received from a plurality of individual servers 3 and general data received from an external information system 7a (information providing service center, etc.). Thus, a general driver model Ma is built. This general driver model Ma is consecutively updated by learning new driving data and general data. The driving data and the general data are accumulated in the memory 1b as accumulated data Da.

The general data is, for example, voice data, behavior data, image data, etc. of a human (vehicle driver). The general data is mainly used for building an emotion estimation model constituting a part of the general driver model Ma. Note that for updating the general driver model Ma, it is required to learn aggregated data comprised of driving data from the plurality of individual servers 3 and general data from an external information source is required. Therefore, a processing speed (update interval) of the general driver model Ma is extremely slow (e.g., 1 hour or longer).

The general driver model Ma is applied for a general driver and not a specific driver who drives the vehicle A. Therefore, it uses driving data on a plurality of drivers other than the specific driver and emotion estimation data indicating general human characteristics (general data). The general driver model Ma includes a plurality of submodels. Regarding the theme of each submodel that is given or newly found, the learning engine 11 learns a temporal change in the behavior and state of the general driver from the driving data and general data, and accordingly creates a submodel and updates the general driver model Ma. The submodels include a behavior tendency model, a traveling determination reference model, an emotion estimation model, etc. of the driver for various situations. Further, the general driver model Ma has general knowledge data. The general knowledge data is various types of general information acquired from the driving data and the general data, such as a point of caution on a specific location on a road, information on entertainment/amusement facilities (including restaurant information, etc.).

The following are examples of the submodels of the general driver model Ma: a voice model of various emotions of the general driver (when feeling joy, anger, sadness, enjoyment, etc., especially enjoyment); a state model of enjoyment [a relevance model between various states (the driver, a surrounding environment and the vehicle) and enjoyment]; a submodel regarding an occurrence of inattentive driving or drowsy driving that is generated based on map data, facial expression data of the driver, etc. (e.g., a submodel for identifying a specific location, a state of the driver [e.g., traveling time], etc. in which such driving easily occurs); and a driving operation characteristic model generated based on travel history data, operation history data, etc. (e.g., a position of starting an obstacle avoiding action).

In a case where the learning engine 11 builds an operation model of an accelerator and a brake, by using data on the driver, a traveling location, the surrounding environment, a time zone, an accelerator opening, a brake sensor value, etc. that are included in the driving data as a group of data, the learning engine 11 learns how the accelerator and the brake are operated according to a position, speed, number, etc. of preceding vehicle(s) and pedestrian(s), and creates the model.

Further, in a case where the learning engine 11 builds a smile determination model included in the emotion estimation model, it analyzes the voice data of the general driver or a general person and image data related to the voice data, and analyzes features of facial expression when the general driver feels enjoyment. Thus, the smile determination model indicating relevance between a change in a feature part (an angle of the corner of the mouth, angles of the corners of the eyes, etc.) extracted from the appearance (i.e., facial expression) and the smile determination model is generated and updated. By using the smile determination model, whether the driver is smiling (or whether he/she is feeling enjoyment) is estimated from the information of the feature part (the angle of the corner of the mouth, etc.). The feature part may be a specified part or a part newly detected by the learning engine 11.

Further, the general driver model Ma includes the relevance model between a vehicle state and an emotional state of the driver (emotion generation model). The emotional state is analyzed from the driver state data. The learning engine 11 analyzes a transition of the emotional state, analyzes the vehicle state that affects the emotional state (the driving state: a vehicle speed; a lateral acceleration; a longitudinal acceleration, etc., and an on-board device operation state: an air conditioning temperature; a seat position; and music, etc.), and learns the type of the vehicle state that influences the emotional state and the relevance between the vehicle state and the emotional state. The vehicle state (control factor) which influences the emotional state may be set in advance or artificial intelligence may find a new control factor by analysis and additionally set it.

The driver state data used for analyzing the emotional state is voice data, image data, electroencephalogram data, etc. For the emotional analysis, for example, a frequency analysis of a sound wave based on an involuntary movement of a vocal cord is conducted by analyzing the voice data (spoken voice). Further, a facial expression analysis based on the image data and a facial color analysis for a change of the blood flow are conducted. Moreover, an analysis on a ratio of a sympathetic nerve with respect to a parasympathetic nerve of an autonomic nervous system is conducted. By using one or more of these analyzes, for example, the emotional state is identified on, for example, an emotion map indicating the various emotions on coordinates or a Russell's circumplex model of affect. The learning engine 11 analyzes a change in the emotional state (i.e., a movement on the emotion map or the circumplex model) and a change in the vehicle state.

For example, in a case where the learning engine 11 learns a relevance model between the temperature environment and the emotional state, by using data on the driver, the emotional state, the traveling location, the time zone, an in-vehicle temperature, weather, etc. that are included in the driving data as a group of data, the learning engine 11 learns an influence of the temperature environment (e.g., a difference between the in-vehicle temperature and an outside temperature, the weather, etc.) on the emotional state, and updates the relevance model.

Further, when it is learned that a new control factor that is not included in the existing relevance model causes a change in the emotional state (e.g., the driver feels enjoyment due to a combination of a plurality of items of the vehicle state), a new relevance model based on the new control factor is generated. In this manner, the learning engine 11 builds a model by detecting from the aggregated data the control factor that influences the emotional state of the driver.

In each individual server 3, a learning engine 31 (i.e., an individual driver model learning engine executed by the computing unit 3a) comprised of artificial intelligence learns driving data received from the vehicle A (including the voice data), general data acquired from an external information system 7b, and communication data acquired from a portable information terminal device 7c of the specific driver (telephone voice data, mail text data, device setting information, etc.). Thus, an individual driver model Mb is built. This individual driver model Mb is also updated consecutively. The individual server 3 learns a temporal change or history of the driver behavior, a vehicle behavior, a vehicle performance, etc., using the driving data, etc. Therefore, a processing speed of the individual driver model Mb is slower than that of various control processes in the vehicle A (e.g., 1 sec or longer).

Note that the general data acquired by the individual server 3 is voice data, behavior data and image data of a plurality of drivers included in a group of drivers who are considered to have a common driving tendency (e.g., a group of drivers having the same type of vehicles). Further, the device setting information is, for example, bookmark information, etc. registered in an Internet browser application of the portable information terminal device.

The voice data acquired by a microphone of the vehicle A, although is also included in driving data acquired via a second synchronization engine 60 of the on-board controller 5, is directly outputted to the individual server 3 in real time via a communication device. In the individual server 3, the voice data is voice-recognized. The driving data, the general data, and the voice data are accumulated in the memory 3b as accumulated data Db. Further, a first synchronization engine 40 of the individual server 3 performs a data conversion on the accumulated data which is stored in the memory 3b, and transmits it to the shared server 1.

The individual driver model Mb is applied for the specific driver. Therefore, the driving data of the specific driver who drives the vehicle A and the general data of another driver considered to have driving characteristics that are relatively close to those of the specific driver are used. The individual driver model Mb also includes a plurality of submodels similarly to the general driver model Ma. Further, the individual driver model Mb has surrounding environment state data and vehicle state data extracted from the acquired driving data. The learning engine 31 also builds a plurality of submodels similarly to the learning engine 11 (refer to the examples of the submodels of the general driver model Ma as examples of the submodels of the individual driver model Mb). Moreover, similar to the learning engine 11, the learning engine 31 detects a control factor that influences the emotional state of the driver, updates the model, and builds a new model.

The on-board controller 5 performs given vehicle control processing by a vehicle control block 51 (e.g., a computing unit) based on sensor data of vehicle sensors 8. The vehicle control block 51 controls various on-board devices and systems of the vehicle A on a rule basis by using a vehicle control algorithm (vehicle control program) 50 which defines the vehicle control processing. That is, based on the sensor data, various controls are performed according to a given rule, i.e., algorithm (rule-based processing). Therefore, in the vehicle control processing by the on-board controller 5, a high processing speed is achieved (e.g., 10 msecs or less).

The vehicle control processing includes the drive control processing and the drive assistance processing. The drive assistance processing includes autonomous drive assistance processing, assistance information presentation processing, and on-board device control processing.

In the autonomous drive assistance processing, an instruction signal is outputted to vehicle control systems 9d (engine, brake, steering), and the accelerator, the brake, and the steering device are automatically operated.

In the assistance information presentation processing, various types of assistance information for assisting the driving operation of the driver are provided via on-board information presentation devices 9a (navigation device, meter, speaker, etc.), and information is provided to an external information system, an information terminal device, a home appliance, etc. via information communication devices 9c (on-board communication unit, portable information terminal device, etc.).

In the on-board device control processing, on-board devices 9b (air conditioner, window, light, door, etc.) is automatically operated to improve the driving environment. For example, the temperature setting and on/off of the air conditioner are automatically performed, and the window is automatically opened and closed.

The vehicle sensors 8 include an in-vehicle camera, a biological sensor, the microphone, an external camera, a radar, a navigation device, a vehicle behavior sensor, a driver operation detection sensor, an inter-vehicle communicator, a vehicle-to-infrastructure communicator, a remote controller, etc.

The in-vehicle camera captures images of the driver and other passengers in the vehicle A, and outputs in-vehicle image data.

The biological sensor measures a heart rate, pulse, sweat, electroencephalogram, etc. of the driver, and outputs biological data.

The microphone collects the voice of the driver and other passengers, and outputs the voice data.

The external camera captures images of the front, left, right, and rear sides of the vehicle A and outputs external image data.

The radar discharges radio waves, sound waves or laser light towards the front, left, right, and rear sides of the vehicle A, receives reflection waves from an object located around the vehicle A (a preceding vehicle, another vehicle, a pedestrian, a fixed object on the ground, an obstacle, etc.), and outputs external object data of a relative position, relative speed, etc. of the object (e.g., a position, relative speed, etc. of the preceding vehicle).

The navigation device acquires the vehicle position information and outputs navigation data (a plurality of route information, route information selected by the driver, etc.) in combination with internal map information, and traffic jam information and input information (destination, way point, etc.) acquired externally.

The vehicle behavior sensor and the driver operation detection sensor include a speed sensor, a longitudinal acceleration sensor, a lateral acceleration sensor, a yaw rate sensor, an accelerator opening sensor, an engine speed sensor, an AT gear position sensor, a brake switch sensor, a brake hydraulic pressure sensor, a steering angle sensor, a steering torque sensor, a turn signal switch position sensor, a wiper switch position sensor, a light switch position sensor, in-vehicle and external temperature sensors, etc.

The inter-vehicle communicator, the vehicle-to-infrastructure communicator, and the remote controller acquire communication data from other vehicles, traffic data (traffic jam information, limit speed information, etc.) from the traffic infrastructure, and remote operation data obtained externally, and outputs them.

Output data from the vehicle sensors 8 is inputted to the vehicle control block 51 as driving data. Further, the output data is converted into driving data indicating various physical quantities that are suitable for execution of the processing in the vehicle control block 51 by a given device (not illustrated) or by a data processing block in the on-board controller 5. The output data is then inputted to the vehicle control block 51. By the data conversion, single output data is converted into driving data indicating one or more information. The data conversion also includes not converting the output data.

For example, the external image data of the external camera is converted into positional data of a preceding vehicle or a traffic lane, offset (deviation) data from a reference line (the center of the traffic lane or a set route), etc. Further, steering angle data of the steering angel sensor is converted into fluctuation data (data of a wandering steering angle; fluctuation range, fluctuation cycle, etc.). Moreover, the image data of the in-vehicle camera is converted into individual identification data (a result of a driver authentication based on a pre-registered driver image, and individual data for identifying the authenticated driver), facial expression data for determining a smile of the driver (the angle of the corner of the mouth, the angles of the corners of the eyes, etc.), etc.

The driving data is various data related to the driver, the surrounding environment, and the vehicle, and includes driver state data, surrounding environment data, and vehicle state data. Each of these data is comprised of a plurality of data pieces.

The driver state data indicates a physical state of the driver, and includes the in-vehicle image data (including captured image data of the driver), the voice data, the biological data (including heart rate data), etc.

The surrounding environment data indicates conditions of objects outside the vehicle, such as the other vehicle, the pedestrian, the obstacle, a road shape, and a traffic condition around the vehicle A, and includes external image data, external object data, navigation data, inter-vehicle data, vehicle-to-infrastructure data, etc.

The vehicle state data indicates a vehicle operation state and operation states of the on-board devices, and includes measurement data obtained by the vehicle behavior sensor, driver operation data indicating the switch positions, etc. of the on-board devices obtained by the driver operation detection sensor, and individual identification data. The vehicle state data includes, for example, the vehicle speed, the longitudinal acceleration, a lateral acceleration, a yaw rate, the accelerator opening, an engine speed, an AT gear position, a brake switch position, a brake hydraulic pressure, a front inter-vehicle distance, a relative speed with respect to the preceding vehicle, the steering angle, a steering torque, a turn signal switch position, a wiper switch position, a light switch position, in-vehicle and external temperatures, individual identification information, etc.

The second synchronization engine 60 of the on-board controller 5 performs a data conversion of the driving data that is temporarily stored in the memory 5b, and transmits it to the individual server 3.

As illustrated in FIG. 3, the vehicle control block 51 includes a current state analysis block 51a, an ideal state analysis block 51b, a difference calculation block 51c, an entertainment control block 52a, and a safety control block 52b.

The driving data is inputted to the current state analysis block 51a and the ideal state analysis block 51b. The current state analysis block 51a extracts a current driver state, a current device operation state, a current surrounding environment state, and a current vehicle state from the driving data. On the other hand, the ideal state analysis block 51b calculates an ideal driver state, an ideal device operation state, an ideal surrounding environment state, an ideal vehicle state from the driving data based on the vehicle control model (ideal model) defined by a large number of control parameters P.

The driver state is identified from, for example, heart rate data of the driver, wandering analysis data, etc. The surrounding environment state is identified from, for example, camera image data, radar measurement data, etc. The vehicle state is identified from, for example, lateral acceleration data, engine power data, brake abrasion amount data, etc.

The difference calculation block 51c calculates a difference between the current state and the ideal state (the driver state, the device operation state, the surrounding environment state, and the vehicle state) outputted from the current state analysis block 51a and the ideal state analysis block 51b in terms of various items, and outputs it as difference data.

The entertainment control block 52a and the safety control block 52b performs various processes based on the difference data.

The safety control block 52b controls safety control processing accompanied by the operations of the vehicle control systems 9d and also controls assistance information presentation processing accompanied by the operations of the information presentation devices 9a, the on-board devices 9b, and the information communication devices 9c. On the other hand, the entertainment control block 52a controls entertainment control processing accompanied by the operations of the information presentation devices 9a, the on-board devices 9b, and the information communication devices 9c, however it does not perform control processing accompanied by the operations of the vehicle control systems 9d.

The entertainment control block 52a and the safety control block 52b output operation instructions to the information presentation devices 9a, the on-board devices 9b, and the information communication devices 9c based on the difference data. Further, the safety control block 52b also outputs an operation instruction to the vehicle control systems 9d. Note that data transmitted to the external information system 7b via the information communication devices 9c may be accumulated in the information system 7b and further provided to the individual server 3.

For example, a case is considered in which the current state analysis block 51a analyzes that the driver is driving the vehicle A at 60 km in a normal state where an awareness level is high, and a curve exists at 30 meters ahead. Here, the ideal state analysis block 51b calculates (estimates) a scheduled traveling route (including a position and speed) for the driver to turn the vehicle at the curve in the current state, based on the ideal model of the vehicle control algorithm 50. Since the current state analysis block 51a continues to conduct the state analysis, the current state analysis block 51a outputs a traveling route on which the vehicle A actually traveled, as an analysis result.

The difference calculation block 51c calculates a difference between the scheduled traveling route obtained by the ideal state analysis block 51b and the actual traveling route obtained by the current state analysis block 51a. Further, for example, the safety control block 52b does not perform particular processing when a scheduled speed and an actual speed are substantially equal, performs processing of issuing a brake operation alarm when the speed difference is small, and performs processing of operating an automatic brake when the speed difference is large.

Further, when an actual steering operation timing is later by over a given period of time than a steering operation timing defined by the scheduled traveling route, a message prompting to advance the steering operation timing is displayed.

Moreover, when an estimated heart rate according to the ideal model is higher than an actual heart rate by over a given value (estimated to be in an excited state) in a given situation, the entertainment control block 52a performs the processing of displaying a message prompting the driver to take a break or a message prompting to play music to calm the mood of the driver.

Figure 4:
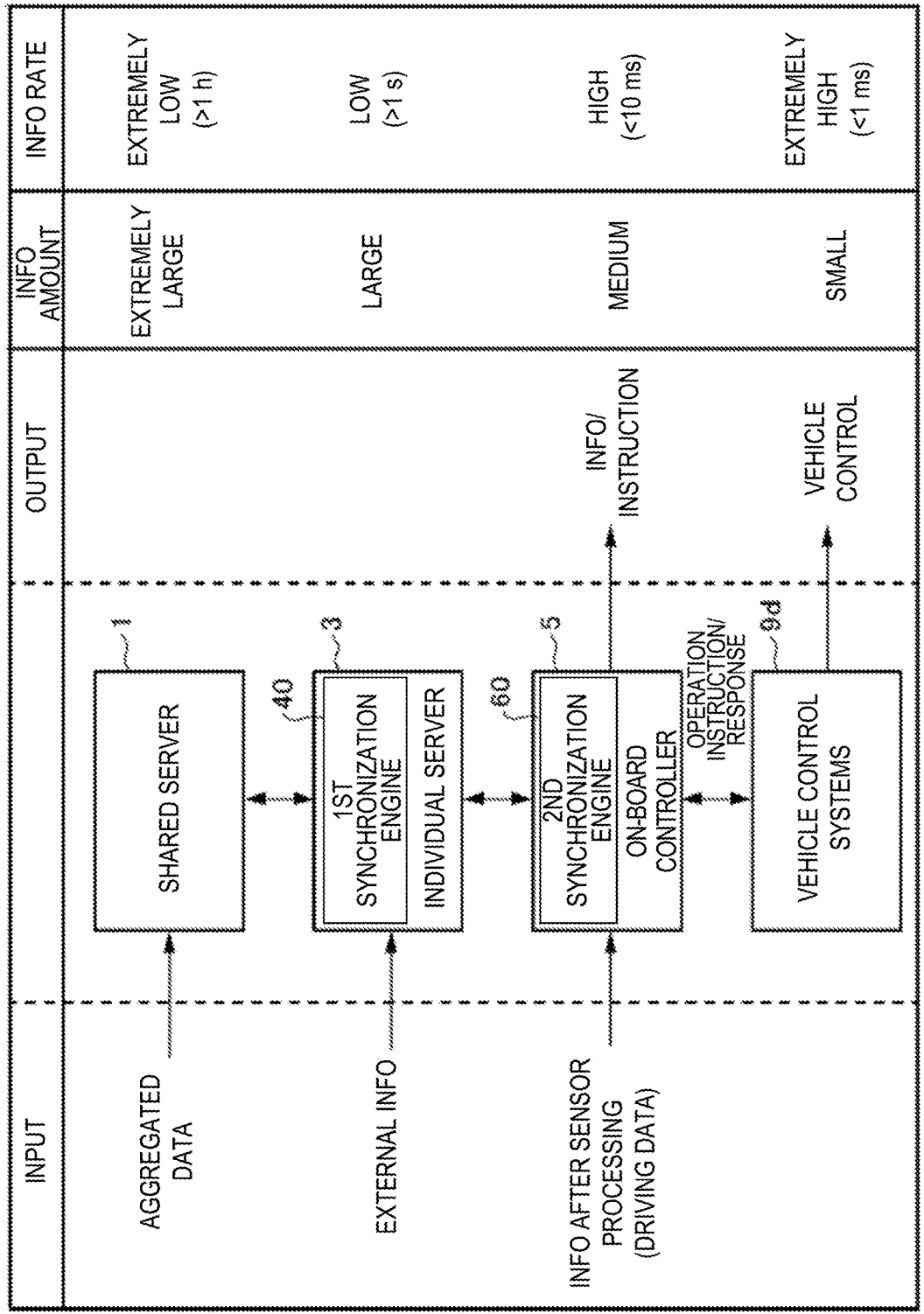
FIG. 4 is a diagram of a data flow among a shared server, an individual server, and an on-board controller according to the embodiment of the present disclosure.
Figure 5:
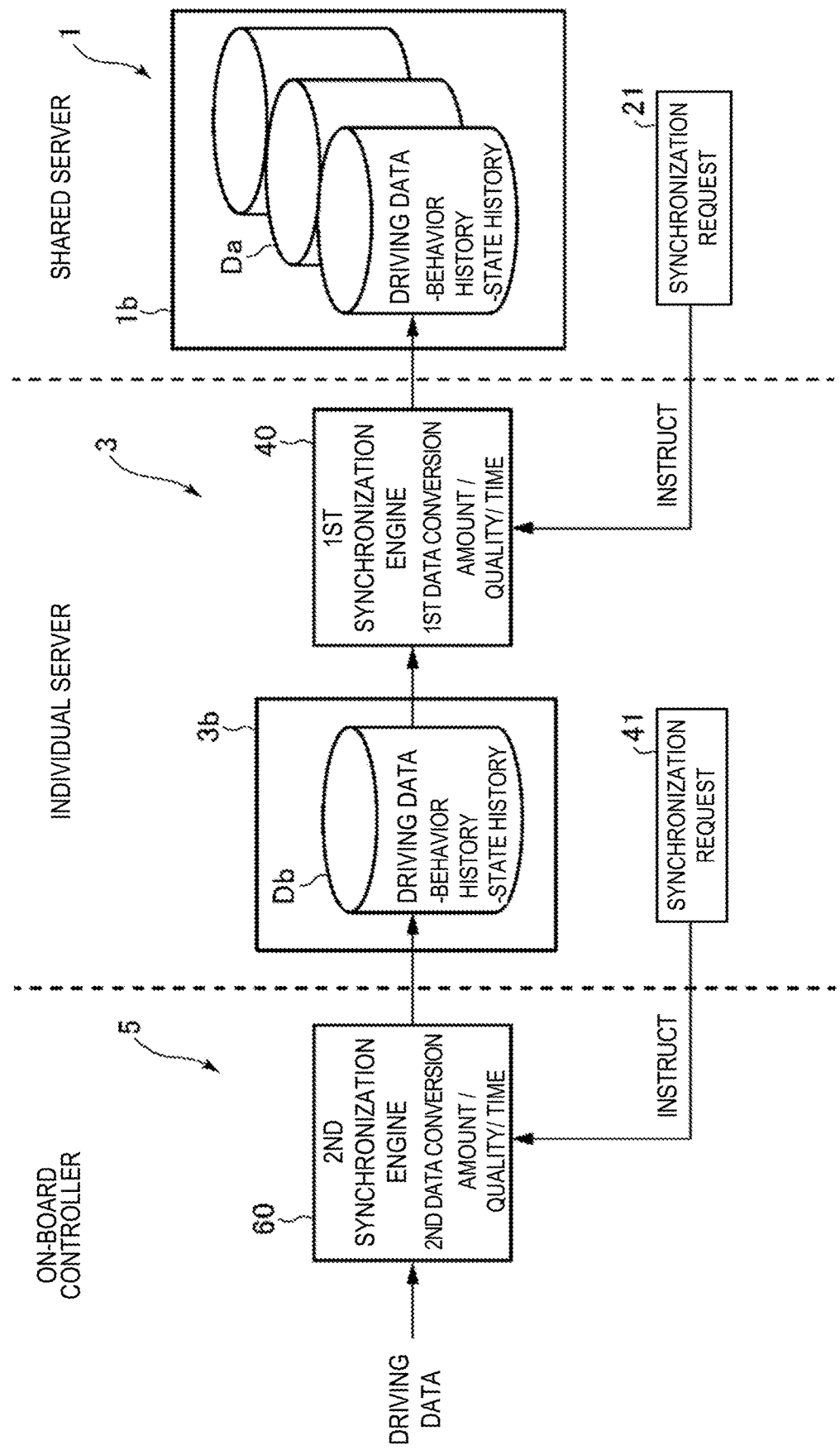
FIG. 5 is a diagram of operations of synchronization engines according to the embodiment of the present disclosure.

Next, the first synchronization engine 40 of the individual server 3 and the second synchronization engine 60 of the on-board controller 5 are described with reference to FIGS. 4 and 5. FIG. 4 is a diagram of a data flow among the shared server, the individual server, and the on-board controller, and FIG. 5 is a diagram of operations of the synchronization engines.

As illustrated in FIG. 4, the on-board controller 5 performs recognition, determination, and decision of action on a rule basis based on the driving data (information amount "medium"). Therefore, a target information rate on the on-board controller 5 is high (<10 msecs). Further, when the vehicle control systems 9*d*, the on-board devices 9*b*, etc. receive an operation instruction from the on-board controller 5 (information amount "small"), they operate according to the instruction based on the decision of action. Therefore, the information rate is extremely high (<1 msec).

On the other hand, the individual server 3 learns and grows based on the driving data from the on-board controller 5 and the data from the external information system 7*b* (information amount "large"), etc. Therefore, the information rate on the individual server 3 is low (>1 sec). Furthermore, the shared server 1 learns and grows based on the driving data from the plurality of individual servers 3 and the big data from the external information system 7*a*, etc. (information amount "extremely large"). Therefore, the information rate on the shared server 1 is extremely low (>1 hour). In other words, the handled information amount is larger on the higher layer than the lower layer, whereas the information rate is lower. The shared server 1 is located at the highest layer and the on-board controller 5 is located at the lowest layer.

Therefore, in this embodiment, an information entropy is equalized so that data processing is performed smoothly in each layer (that is, the flow of the data processing does not deteriorate in any of the layers). In general, a processing load at each moment (per unit time) is equalized by adjusting the data amount which is processed per unit time in each layer, by having an operation load of the processing performed in each layer (a total number of steps of a processing program) and a target response time in performing all the processing steps as known.

In this embodiment, the information entropy is defined by "data amount per unit time×processing speed." The processing speed is defined by "the total number of steps of the processing program (the number of all program lines)×the target response time."

$$\text{Information entropy} = \text{data amount} \times \text{total number of steps} \times \text{target response time}$$

For example, in the on-board controller 5, when the data amount is 10 MB (megabytes), the number of steps is 1,000 lines, and the target response time is 10 msecs, the setting in the individual server 3 is 100 kB (kilobytes), 10,000 lines, and 1 sec, and the setting in the shared server 1 is 10 B (bytes), 100,000 lines, and 1,000 secs.

Since the data amount of each layer is adjusted in this manner, when transmitting the driving data from the lower layer to the higher layer, the data conversion of the driving data is performed by the lower-layer synchronization engine so that it becomes easy for the higher layer to process the driving data. By this data conversion, the driving data is converted in terms of amount, quality, and time. The on-board controller 5 includes the second synchronization engine 60, and the individual server 3 includes the first synchronization engine 40.

As illustrated in FIG. 5, the on-board controller 5 consecutively receives the driving data based on the output data of the vehicle sensors 8 and performs the vehicle control processing. On the other hand, the second synchronization engine 60 performs second data conversion processing (amount, quality, and time) on the driving data, and transmits the data-converted driving data to the individual server 3. The individual server 3 accumulates the received driving data as behavior history data and state history data of the driver in the memory 3*b* and uses it for particular processing. Further, the first synchronization engine 40 performs first data conversion processing (amount, quality, and time) on the received driving data, and transmits the data-converted driving data to the shared server 1. The shared server 1 accumulates the received driving data as the behavior history data and the state history data of the driver in the memory 1*b* and uses it for particular processing.

Synchronization request blocks 21 and 41 which are located in higher layers than the synchronization engines 40 and 60, respectively, issue acquisition request instructions to request for transmission of the driving data which has a required information attribute, to the synchronization engines 40 and 60 according to methods requested in the processing in the higher layers, respectively. Upon receiving the instruction, each of the lower-layer synchronization engines performs data conversion processing corresponding to the requested information attribute. The lower-layer synchronization engine issues a data conversion instruction to other data processing blocks (not illustrated) in the same lower layer to convert the data, and outputs the data-converted driving data to the higher layer. Further, the lower layer monitors the higher layer. For example, the synchronization request blocks 21 and 41 output to the first synchronization engine 40 and the second synchronization engine 60, the acquisition request instructions which define a data amount reduction method, a data piece association and exclusion method (specifying a plurality of data pieces), and a time axis setting method (an extraction method or a statistical processing method).

In the data conversion processing regarding amount, the amount of the driving data is reduced. For example, data amount reduction processing is performed by an extraction of the feature amount, a conversion of the information amount, etc. The first synchronization engine 40 and the second synchronization engine 60 perform first data amount reduction processing and second data amount reduction processing, respectively.

In the extraction of the feature amount, the data size is reduced to include minimum information required in the processing in the higher layer. For example, the image data is converted into data of the feature amount extracted from the image data (the information of the angle of the corner of the mouth, traffic lane, etc.).

In the conversion of the information amount, the driving data is converted (averaged, time-filtered, etc.) into a summary statistics amount. For example, a deviation amount (deviation amount data of every 10 msecs) from a center line on the road is converted into average deviation amount data at an interval of 100 secs. Further, the steering angle data of every 10 msecs is converted into wandering degree determination data in a unit of 5 secs.

The synchronization engines may cause the other processing blocks to perform the extraction of the feature amount and the conversion of the information amount.

In the data conversion processing regarding quality, data relevance conversion processing of converting relevance between the information of the plurality of items of the driving data is performed. The first synchronization engine 40 and the second synchronization engine 60 perform first data relevance conversion processing and second data relevance conversion processing, respectively.

In the relevance conversion, a plurality of data pieces are selectively associated with each other. For example, the association is performed on the individual identification data with the heart rate data, time data with the heart rate data, and position data with the heart rate data. Alternatively, the individual identification data, the heart rate data, the time data, and the position data may be associated into single data. By this association, the associated data is processed as integrated data in processing of a certain purpose. Therefore, the processing amount in the higher layer is reduced. For example, the angle data of the corner of the mouth (feature amount data obtained by the data amount reduction processing), the voice data, driving operation data, in-vehicle environment data (air conditioning, audio, etc.) are associated with each other for building the smile determination model.

Further in the relevance conversion, specific information is deleted from the plurality of associated information. For example, the individual identification data is excluded. The individual server 3 uses complex data in which a specific data piece is associated with another individual identification data, while the shared server 1 uses complex data created by excluding the individual identification data from the complex data used by the individual server 3 so as to secure the anonymity of the complex data. Further, in a case where the individual identification data includes a name, age, sex, address, etc., the exclusion may be targeted only on specific item(s) (e.g., name and sex).

In the data conversion processing regarding time, time axis change processing in which the driving data is processed with respect to a time axis is performed. The first synchronization engine 40 and the second synchronization engine 60 perform first time axis change processing and second time axis change processing, respectively.

In the processing with respect to the time axis (time axis processing), given time variation data is selectively extracted (sampled) on the time axis. For example, when the quality of the data is constant, the information is thinned out in the time axis direction. Specifically, the heart rate data at an interval of 10 msecs is thinned out to, for example, heart rate data at an interval of 100 msecs. Further, for example, when the heart rate data is used to detect arrhythmia, only the heart rate data indicating a significant numeric value (exceeding a given threshold) is selectively extracted by the time axis processing. Further in this time axis processing, conversion (averaging and time filtering) of the driving data into summary statistic amounts and conversion into statistical information (e.g., frequency distribution, etc.) are performed by statistical processing. In the time axis processing, a selective extraction time interval (constant or inconstant) and a statistical processing time interval on the time axis are set according to update processing time lengths (target response time) of the general driver model Ma and the individual driver model Mb. Therefore, an output interval of the driving data, which is a result of the time axis processing, becomes longer as the target response time is longer.

Note that although in this embodiment the data amount is adjusted between the layers (the shared server 1, the individual server 3, and the on-board controller 5), without limiting to this, the data amount may similarly be adjusted between the functional blocks of each layer (e.g., between computers which constitute the learning engine 31, a parameter update engine 32, a recommendation engine 33, a difference analysis engine 34, and a result verification engine 35, respectively).

Figure 6:
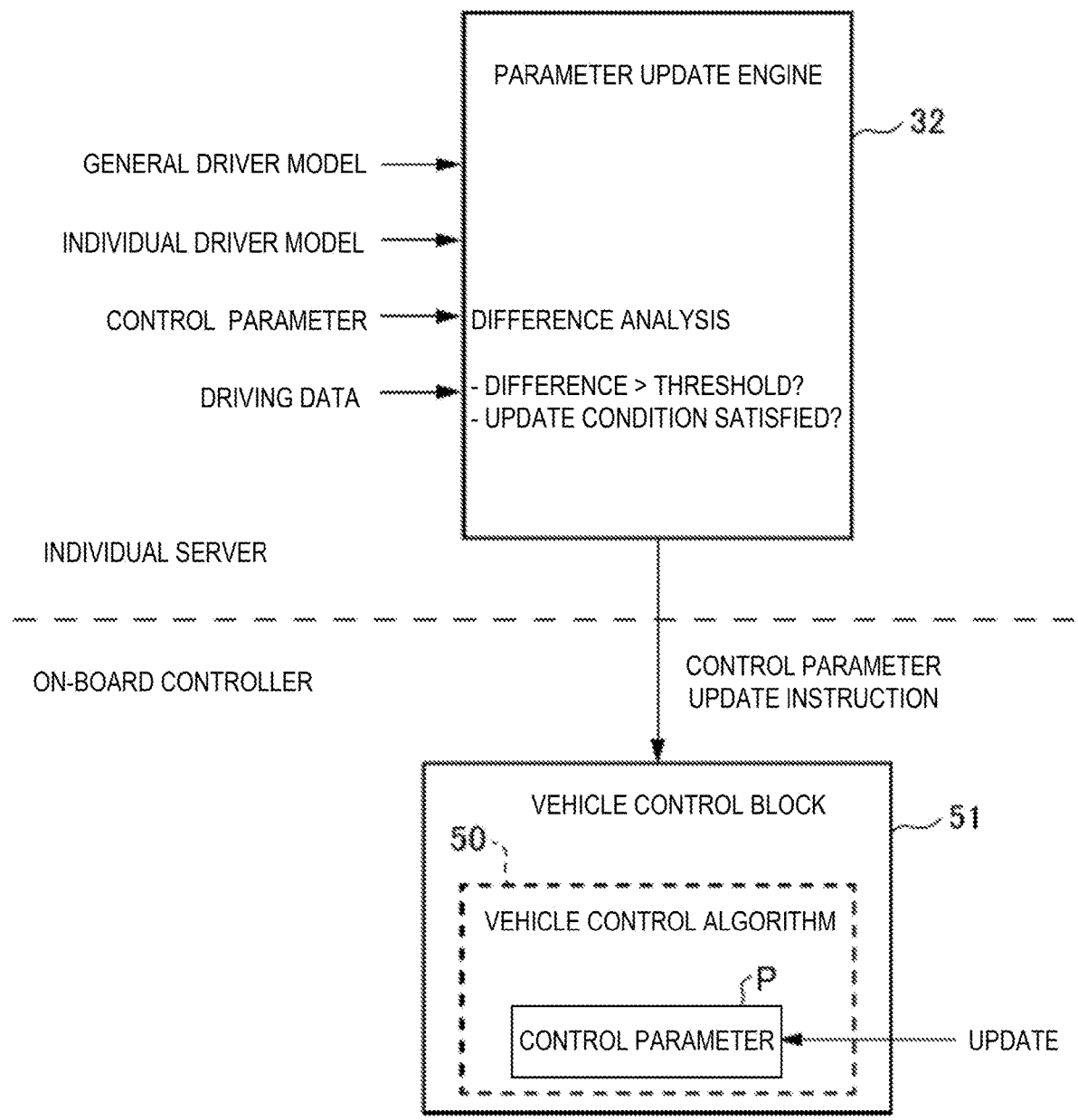
FIG. 6 is a diagram of parameter update processing according to the embodiment of the present disclosure.

Next, parameter update processing is described with reference to FIG. 6. FIG. 6 is a diagram of the parameter update processing. The individual server 3 includes the parameter update engine 32.

The parameter update engine 32 acquires the general driver model Ma from the shared server 1, acquires from the on-board controller 5 various control parameters P and the driving data (including the voice data and the vehicle state data) which define the vehicle control processing, and updates the control parameters P by referring to the individual driver model Mb.

In principle, the parameter update engine 32 determines whether the individual driver model Mb is updated by the learning engine 31, and according to this update, updates the vehicle control algorithm 50 related to the updated portion. For example, the control parameters P included in the vehicle control algorithm 50 (including the values and kinds of the control parameters) are changed.

Therefore, the parameter update engine 32 compares the individual driver model Mb before the update with the latest individual driver model Mb, and extracts the updated portion. The parameter update engine 32 extracts the control parameter(s) P corresponding to the updated portion from the various control parameters P acquired from the vehicle A. Further, the parameter update engine 32 acquires a driver model parameter of the individual driver model Mb corresponding to this control parameter P.

The acquired driver model parameter and the corresponding control parameter P are compared with each other (difference analysis). Note that in a case where the driver model parameter relates to the control parameter P but does not directly correspond thereto, the driver model parameter is converted so as to correspond directly to the control parameter P, and the converted value is compared with the control parameter P.

As a result of the difference analysis, when the difference exceeds a threshold which is set according to the kind of the control parameter P, the driver model parameter (or the converted value) is set to be an update parameter. Further, the parameter update engine 32 determines whether a given update condition is satisfied. When the update condition is satisfied, the parameter update engine 32 outputs a control parameter update instruction in order to update the control parameter P to the update parameter. Upon receiving this control parameter update instruction, the on-board controller 5 updates the corresponding control parameter P to the new update parameter.

In this embodiment, contents and time of the update are defined as the given update condition. Regarding the update contents, if the control parameter P to be updated is of the vehicle control processing regarding travel safety related to traveling, stopping, and turning (vehicle travel safety control processing), the update is prohibited because the change may result in causing uncomfortableness to the driver during the driving operation. The vehicle travel safety control processing is accompanied by an automatic accelerator control, an automatic brake control, an automatic steering control. For example, the vehicle travel safety control processing includes danger avoidance control processing for preventing a collision with an obstacle or a deviation from a traveling road. Furthermore, the wandering determination processing is also included in the vehicle control processing related to the travel safety.

On the other hand, if the update contents are updatable, the parameter update engine 32 determines the update timing (when the vehicle is stopped or when an ignition switch (IG) is off) based on the driving data (vehicle state data), and when an update timing condition is satisfied, transmits the control parameter update instruction. Note that although in this embodiment the parameter update engine 32 determines the update condition, the on-board controller 5 may determine the update condition upon receiving the control parameter update instruction.

Further, the update timing is defined according to the update contents. The update timing includes immediately (when the individual driver model Mb is updated), when the vehicle is stopped, and when the IG is off. The update timing of the control parameter P which is allowed to be changed while traveling is set to "immediately." Examples of the updatable parameters for "immediately" include a smile determination parameter (the angle of the corner of the mouth) of the smile determination processing, an air conditioner setting temperature, accident information, etc.

Moreover, an update timing of the control parameter which is suitable to be updated when the vehicle is stopped is set to "when the vehicle is stopped." Examples of the updatable parameters for "when the vehicle is stopped" include a dead-man determination parameter (e.g., an angle of the body of the driver in the driver image data) of dead-man determination processing, a vehicle seat position and a mirror angle.

Further, an update timing of the control parameter which is suitable to be updated when the IG is off is set to "when the IG is off." One example of the updatable parameters for "when the IG is off" is general map information.

Moreover, when the updated individual driver model Mb generates a new submodel or when the learning engine 31 determines that compared to the existing submodel, a different submodel is more suitable for particular processing and is more effective, a new control parameter P may be added corresponding to the submodel. For example, a case is considered in which as a result of the learning, the angles of the corners of the eyes are analyzed to be more effective in the driver's smile determination than the angle of the corner of the mouth, and a new smile determination model is generated based on the angles of the corners of the eyes. In this case, the control parameter P is set instead of or in addition to the existing submodel which is based on the angle of the corner of the mouth. For example, the type of the control parameter P used for a smile determination logic in the vehicle control processing which is included in the vehicle control processing is changed from the angle of the corner of the mouth to the angles of the corners of the eyes, and the value of the control parameter P is changed from an angle threshold of the corner of the mouth to an angle threshold of the corners of the eyes.

Further, an example is described in which particular processing (changing the order of traveling route proposals, steering vibration, increasing speaker volume, etc.) is performed in the vehicle control processing when the driver is determined to be feeling drowsy. The learning engine 31 builds a submodel which is based on the wandering angle of the steering as a drowsiness determination model. Therefore, in the drowsiness determination processing in the vehicle A, the drowsiness is determined to be great when the wandering angle (fluctuation range) of the steering exceeds a determination threshold. When the learning engine 31 learns that the wandering angle of the vehicle A is large even normally, it updates the submodel, and accordingly the determination threshold (the value of the control parameter) is updated to be higher.

On the other hand, when the learning engine 31 learns that a fluctuation cycle is more effective than the wandering angle of the steering in determining drowsiness, it adds a submodel based on the fluctuation cycle of the wandering angle of the steering as a drowsiness determination model. Therefore, in the drowsiness determination processing in the vehicle A, the type of the control parameter is changed to the fluctuation cycle of the wandering angle and the value of the control parameter (determination threshold; fluctuation cycle) is also changed.

Further, when a drowsiness determination submodel based on image data is added, correspondingly, the kind of the control parameter in the vehicle A is changed to a certain feature amount of the image data, and the value of the control parameter (determination threshold) is also changed.

Next, a case where the general driver model Ma is considered in the parameter update processing is described. That is, if the specific driver of the vehicle A repeats an extreme driving operation different from normal, the individual driver model Mb and the vehicle control processing (control parameters P) may be updated, resulting in decreasing their safety levels. Therefore, when the individual driver model Mb greatly deviates from the general driver model Ma, the control parameters P are updated based on the general driver model Ma for safety security.

The parameter update engine 32 acquires the general driver model Ma and the control parameters P. Further, when the individual driver model Mb is updated, the updated portion is extracted. Moreover, the control parameter(s) P corresponding to this updated portion is acquired. Furthermore, an individual driver model parameter of the individual driver model Mb and a general driver model parameter of the general driver model Ma in this updated portion (or corresponding to the acquired control parameter P) are acquired.

Next, the parameter update engine 32 compares the acquired individual driver model parameter with the acquired general driver model parameter, and calculates a difference therebetween. When the difference is smaller than a given value, an update parameter for updating the control parameter P is calculated based on the individual driver model parameter. On the other hand, when the difference is larger than the given value, the update parameter for updating the control parameter P is calculated based on the general driver model parameter. The calculation of the update parameter is similar to the other case described above.

When the update parameter is calculated in this manner, similar to the other case described above, when a given update condition is satisfied, a control parameter update instruction for updating the control parameter P to the update parameter is outputted.

Next, a case where the update (first update) is conducted in the parameter update processing based on the individual driver model Mb and then the update result is updated again (second update) based on the general driver model Ma according to a given condition is described. That is, although the control parameter P is updated based on the individual driver model Mb, because no improvement is seen in the vehicle control processing, the updated control parameter P is updated again based on the general driver model Ma.

The given condition for the second update is whether the emotional state of the driver is improved by the first update. If the emotional state of the driver is not improved, the control parameter P is updated again. Therefore, the parameter update engine 32 analyzes the emotional state of the driver from emotion analysis data of the driver based on the driving data (voice data).

Note that the emotion analysis may be conducted consecutively by the parameter update engine 32 or may continuously be conducted by another functional block (driver state analyzing unit) and stored as an emotion analysis history. Further, the improvement of the emotional state means that the emotional state changes from an unpleasant negative emotion (sadness, hatred, anger, anxiety, nervousness, dissatisfaction, etc.) to a pleasant positive emotion (joy, enjoyment, relief, relaxation, satisfaction, etc.).

The parameter update engine 32 acquires the control parameters P. Further, when the individual driver model Mb is updated, the updated portion is extracted. Moreover, the control parameter(s) P corresponding to this updated portion is extracted. Further, an individual driver model parameter of the individual driver model Mb in this updated portion (or corresponding to the acquired control parameter P) is acquired. Furthermore, an update parameter for updating the control parameter P is calculated based on the individual driver model parameter.

When a given update condition is satisfied, a control parameter update instruction for updating the control parameter P to the update parameter is outputted. Further, upon receiving this control parameter update instruction, the on-board controller 5 updates the corresponding control parameter P to the new update parameter.

The parameter update engine 32 determines whether the emotional state of the driver is improved by the update of the control parameter P which is conducted due to the update of the individual driver model Mb. If the emotional state of the driver is determined as improved, the update processing of the control parameter P is terminated. On the other hand, if the emotional state of the driver is determined as not improved, the parameter update engine 32 acquires a general driver model parameter of the general driver model Ma corresponding to the control parameter P.

Furthermore, a new update parameter for updating the control parameter P is calculated based on the general driver model parameter. When a given update condition is satisfied, a control parameter update instruction for updating the control parameter P to the new update parameter is outputted. Further, upon receiving this control parameter update instruction, the on-board controller 5 updates the corresponding control parameter P to the new update parameter.

For example, the submodel of the steering operation timing when traveling on a curved road is considered. If stress felt by the driver (based on the heart rate, a voice analysis, etc.) when traveling on the curved road is not reduced after a corresponding control parameter P of the vehicle A (a steering operation guidance timing, etc. in the drive assistance) is updated based on the individual driver model Mb, the same control parameter P is updated based on the general driver model Ma.

Figure 7:
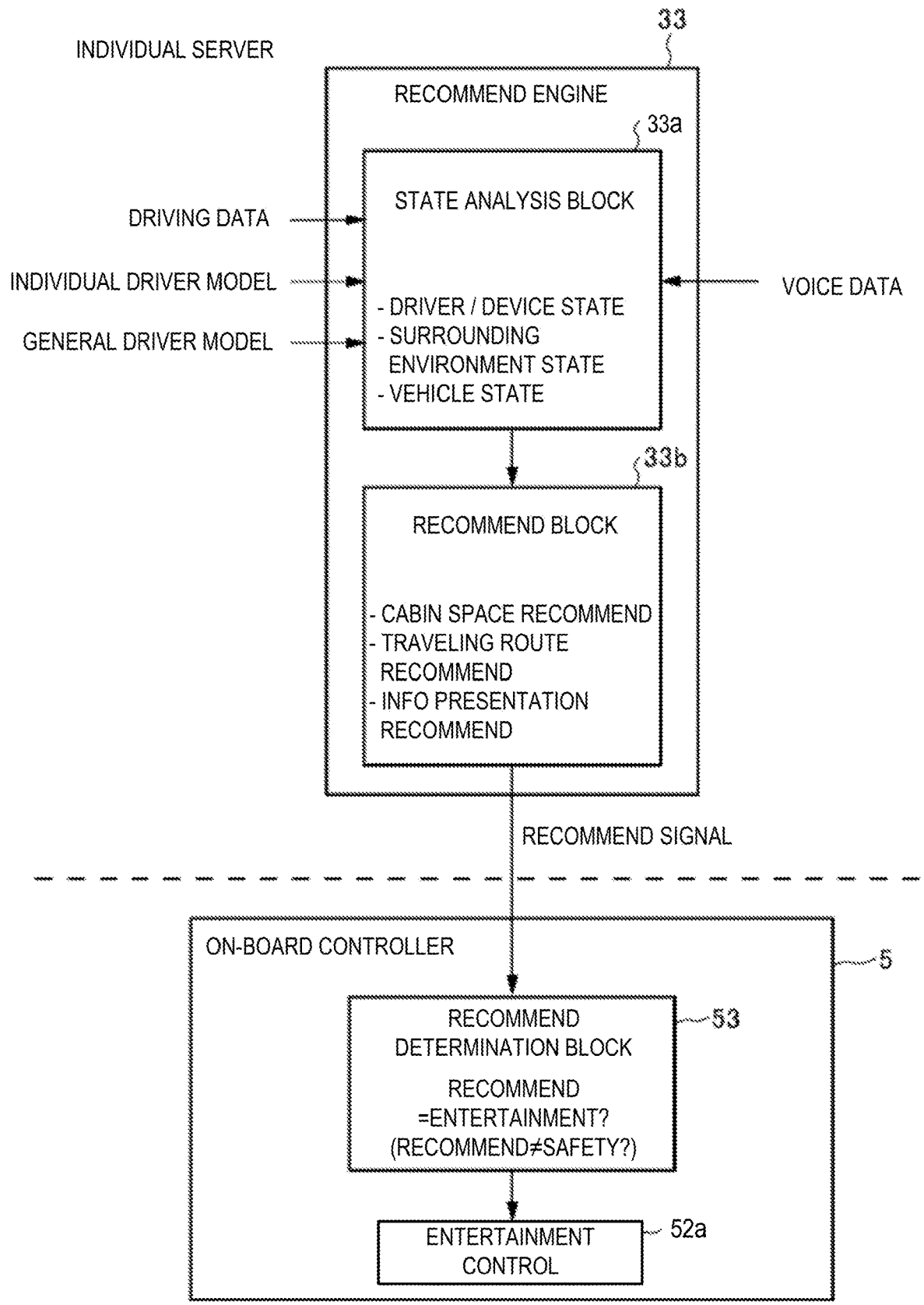
FIG. 7 is a diagram of recommending processing according to the embodiment of the present disclosure.

Next, recommending processing is described with reference to FIG. 7. FIG. 7 is a diagram of the recommending processing. The individual server 3 has the recommendation engine (vehicle control recommending unit) 33.

The recommendation engine 33 instructs or suggests the on-board controller 5 to execute the recommending processing by using the general driver model Ma acquired from the shared server 1, the driving data (including the voice data) acquired from the vehicle A, and the individual driver model Mb. The on-board controller 5 performs the recommending processing when a given condition is satisfied.

The recommendation engine 33 has a state analysis block 33a and a recommendation block 33b.

The state analysis block 33a analyzes the driver state, the surrounding environment state, and the vehicle state based on the driving data (including the voice data), the general driver model Ma, and the individual driver model Mb. The analysis includes analyzing a current state and analyzing a state of the near future (e.g., 30 minutes later, 1 hour later).

The recommendation block 33b derives and outputs a suitable approach (recommending processing) for the driver based on the analysis output of the state analysis block 33a, the driving data, the general driver model Ma, and the individual driver model Mb. Note that since the recommendation engine 33 conducts an advanced state analysis using a large amount of accumulated data, it operates even while the driver is away from the vehicle A and suitably derives the recommending processing.

The driver state includes the state of mind, body, and behavior of the driver. The mind (emotional) state includes an attention state, awareness, emotion, stress level, driving workload, driving motivation, sensation, nervousness, context, etc. The body (physical) state includes fatigue level, health condition, thermal sensation, device viewability, device operability, riding comfort, seating comfort, physical information, etc. The behavior state includes gazed position/target, attention state, gesture, device operation, driving behavior/operation/attitude, dialogue, habit, life behavior, behavior intention, etc.

The mind state (particularly, the emotional state) may directly be analyzed from the voice data (e.g., the emotion analysis using an endocrine model), the image data of the driver, and the heart rate data, or estimated by using the individual driver model Mb based on other driving data (including the captured image data and the heart rate data of the driver).

The surrounding environment state is an environment around the vehicle A, and includes a traffic/traveling environment, a preliminary grasped risk (traffic jam, road surface freeze, etc.), a communication environment, etc.

The vehicle state is the traveling state of the vehicle A and includes a driving difficulty level, wandering etc.

As the recommendation control, the recommendation block performs at least a cabin space recommendation, a traveling route recommendation, and an information presentation recommendation.

The cabin space recommendation is a recommendation control for providing a cabin environment suitable for the driver and includes setting positions and angles of the seat and the mirror, adjusting the air conditioner, and providing music, a welcoming effect, etc.

The traveling route recommendation is a recommendation control for providing a traveling route suitable for the driver and includes presenting a recommended route, a pleasant route, a challenging route with a high driving difficulty level, a danger avoiding route, etc.

The information presentation recommendation includes presenting useful information for the driver and presenting an advanced state estimation result at a suitable timing in a suitable presentation method. The presentation of the useful information for the driver includes presenting information on attraction places on the route (scenery, restaurants, scenic spot, etc.), road traffic/weather/news, attention calling (to prevent lost belongings and delay), To Do list, a memorable image (picture), etc. The presentation of the advanced state estimation result includes presenting information on an advanced dead-man determination and an advanced smile determination.

The recommendation block 33b derives a suitable recommendation control using a basic association table describing relevance between the analysis state and given recommending processing by the state analysis block 33a. Further, this association table may be learned, and updated by the general driver model Ma and the individual driver model Mb.

In accordance with the recommendation signal, the on-board controller 5 outputs instructions to the information presentation devices 9a, the on-board devices 9b, the information communication devices 9c, and the vehicle control systems 9d. The on-board controller 5 may store processing programs that are performed when the respective recommendation signals are received.

In this embodiment, according to the surrounding environment state and the vehicle state, for example, depending on each driver state (fatigue level, emotion, stress, attention state, awareness, etc.) analyzed by the state analysis block 33a, the recommendation block 33b derives suitable recommending processing that is performable, and outputs the recommendation signal.

For example, the state analysis block 33a estimates the body state. Here, a case is considered in which the driver is analyzed to be feeling fatigued. In response to this, the recommendation block 33b selects a suitable recommendation signal from a cabin space recommendation signal, a traveling route recommendation signal, an information presentation recommendation signal according to the situation, and outputs it.

The cabin space recommendation signal is, for example, a signal for instructing to activate the air conditioner, reset (lower) the air conditioning temperature, output a given music channel broadcast from the speaker, change a music channel, change the seat position and the mirror position according to the fatigue level, etc. The traveling route recommendation signal is, for example, a signal for instructing to prompt a change of the route from a currently set route with a high difficulty level (e.g., with many curves) to a new route with a low difficulty level (with many straight roads), etc. The information presentation recommendation signal is a signal for instructing to display on the display screen a given message recommending the driver to take a break or reduce a vehicle speed, etc. Further, a suitable recommendation signal is selected when a given body state or a given mind (emotional) state are analyzed.

Further, the individual driver model Mb includes a submodel indicating a preference of the driver on the settings of the on-board devices (the air conditioning temperature, the broadcast channel, the seat position, the mirror angle, etc.). For example, in a case where the state analysis block 33a analyzes that the settings of the on-board devices are different from the preference of the driver when the driver starts driving or when the given body state or the given mind (emotional) state is analyzed, the recommendation block 33b outputs the cabin space recommendation signal for instructing to change the settings to the preferred settings. In this instruction, the air conditioning temperature, the broadcast channel, the seat position, the mirror angle, etc. are specified as operation parameter values (preferred setting values).

Next, one example of the information presentation recommendation is described. A case is considered in which the state analysis block 33a analyzes that the vehicle A approaches a specific location where inattentive driving or drowsiness is easily induced (surrounding environment state) with reference to the individual driver model Mb. In response to this, the recommendation block 33b outputs a recommendation signal to perform attention calling processing by voice etc. at a position which is a given distance before reaching the specific location (at a suitable timing).

Further, when the state analysis block 33a analyzes that the specific location is the location where inattentive driving or drowsiness is easily induced also to the general driver with reference to the general driver model Ma, the recommendation block 33b outputs a recommendation signal to perform early attention calling processing at a position further before reaching the specific location (at a suitable timing).

Further, the individual driver model Mb includes a submodel indicating preference (food, hobby, sports, etc.) of the driver, which is built based on the communication data acquired from the portable information terminal device 7c (telephone voice data, mail text data, device setting information, etc.). For example, in the submodel of "food," the kinds of favorite cuisines (Japanese cuisine, French cuisine, Italian cuisine, etc.) are ranked based on bookmarks etc. which are device setting information.

When the state analysis block 33a analyzes that an estimated time at which the driver starts to feel hungry, the recommendation block 33b outputs a recommendation signal for displaying restaurant information on the type of favorite cuisine (the type of cuisine and a restaurant name) on a navigation map according to the estimated time (at a suitable timing) based on the submodel. Note that without limiting to a hunger level, the recommendation signal may be selected when a given body state is analyzed or when a given mind (emotional) state is analyzed.

Next, one example of the traveling route recommendation is described. The state analysis block 33a estimates the emotional state or the body state of the driver from the driving data with reference to the individual driver model Mb and the general driver model Ma. Here, a case is considered in which the enjoyment that the driver feels is estimated to be low (or predicted that he/she will feel bored within one hour due to a decrease of the driving motivation).

Upon receiving the analysis output indicating this estimation (prediction), the recommendation block 33b derives the recommending processing for causing the driver to feel enjoyment (or not to feel bored). For example, based on the individual driver model Mb and the general driver model Ma, a particular location registered as a location where the general driver or the driver of the vehicle A feels enjoyment (a road on a coastline, a viewing spot, etc.) is searched within a given distance range from a current position, and a recommendation signal prompting a change in the route so that this particular location is included as a waypoint is outputted. Upon receiving this recommendation signal, the on-board controller 5 inputs the waypoint included in the recommendation signal to the navigation device. Therefore, by the navigation device performing a new route calculation, a new recommended route is displayed on the display screen.

Further, when the state analysis block 33a predicts the road surface freeze from an outdoor air temperature, weather, etc., the recommendation block 33b outputs a recommendation signal for instructing to set a route avoiding a location where the road surface freeze is predicted.

The on-board controller 5 has a recommendation determination block 53 configured to determine whether to perform the recommending processing based on the recommendation signal. The recommendation determination block 53 allows the performance of the recommending processing when it is the entertainment control processing, and denies performance of the recommending processing when it is the safety control processing. In the on-board controller 5, when the performance of the processing is allowed by the recommendation determination block 53, the entertainment control block 52*a* performs the recommending processing according to the recommendation signal.

Note that in this embodiment, whether to perform the recommending processing is determined depending on whether the recommending processing is the entertainment control processing or the safety control processing. However, without limiting to this, if there is a possibility of the vehicle operation being unsafe, performance of the recommending processing may be denied also when the recommending processing is the entertainment control processing. For example, if the recommending processing is processing of retarding an alarm issuing timing for when a brake operation timing is delayed, the performance of the processing is denied since the unsafety level increases, whereas if the recommending processing is processing of advancing the alarm issuing timing, the performance is allowed since the safety level increases.

Moreover, the recommendation determination block 53 denies the performance of the recommending processing also when the recommending processing contradicts or invalidates the vehicle control processing by the on-board controller 5. For example, when the processing of advancing the alarm issuing timing for the brake operation delay is performed in the vehicle control processing due to the weather (when the weather is rainy or visibility is low), the recommending processing is denied if it retards the alarm issuing timing. This is because the recommending processing contradicts or invalidates the vehicle control processing performed due to the weather. On the other hand, the recommending processing is allowed if it advances the alarm issuing timing since such contradiction or invalidation does not occur.

Next, complement processing of the individual driver model with the general driver model is described. Since the traveling of the vehicle A is limited to be within a specific region or by a specific traveling operation, the amount of the reference data (driving data and general data) used for the individual driver model Mb is significantly smaller than the reference data used for the general driver model Ma. Therefore, the individual driver model Mb and the general driver model Ma have a difference from each other according to such difference in the data amount.

A comparison block (not illustrated) of the recommendation engine 33 acquires the individual driver model Mb and the general driver model Ma, and performs comparison processing. By this comparison processing, a submodel, general knowledge, etc. which exist in the general driver model Ma but not in the individual driver model Mb are extracted. The extracted difference data (the submodel, the general knowledge, etc.) is stored as accumulated data via the result verification engine 35 and learned by the learning engine 31. Thus, the submodel, general knowledge, etc. which are adaptable to the vehicle A are added to the individual driver model Mb.

Next, verification processing of the recommendation instruction is described with reference to FIG. 2. The individual server 3 also includes an ideal driver model Mi, the difference analysis engine 34, and the result verification engine 35.

The ideal driver model Mi is created based on a driving operation of an expert driver and is a model of an ideal state where the driver feels enjoyment while focusing on the driving operation in a state where the driving skill of the driver and the traveling difficulty level are well balanced.

The difference analysis engine 34 compares the driver state in the ideal driver model Mi with an actual driver state analyzed based on the voice data of the driver.

The result verification engine 35 analyzes the difference data from the difference analysis engine 34 to verify an influence on the driver state which is caused by the recommending processing performed based on the recommendation signal, and accumulates the verification result in the memory 3*b*. The verification result is an evaluation on a reduction amount of the difference (a shifted amount toward the ideal state) or an increase amount of the difference (a shifted amount away from the ideal state) by performing the recommending processing. By the learning engine 31 learning this verification result, the individual driver model Mb is updated to be more suitable for the specific driver.

Figure 8:
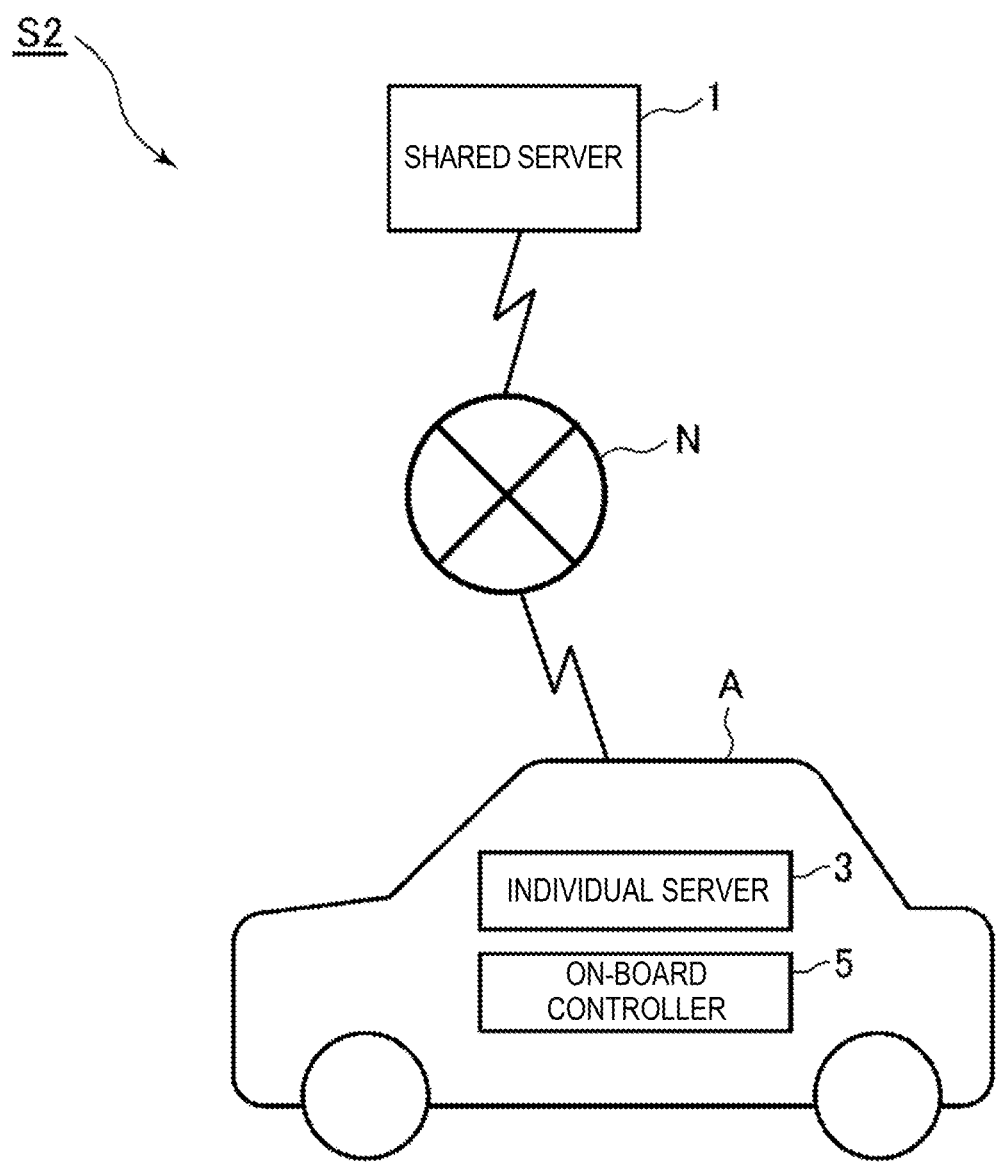
FIG. 8 is a configuration view of a vehicle drive assistance system according to one modification of the embodiment of the present disclosure.

Next, a vehicle drive assistance system according to one modification is described with reference to FIG. 8. FIG. 8 is a configuration view of the vehicle drive assistance system of the modification.

Different from the vehicle drive assistance system S described above, in a vehicle drive assistance system S2 of this modification, the individual server 3 is mounted on the vehicle A. That is, the on-board controller 5 and the individual server 3 are communicably mounted on the vehicle A. The data flow is similar to that of the vehicle drive assistance system S.

In this vehicle drive assistance system S2, the on-board controller 5 and the individual server 3 are connected in a state where they are separated by a gateway having a security function. Therefore, the on-board controller 5 and the individual server 3 are configured as separate units.

In a case where the on-board controller 5 and the individual server 3 are configured as an integrated unit, calculation performance may temporarily become insufficient due to the learning processing of the individual driver model which requires advanced processing, and the vehicle control processing may delay. However, in this modification, since the on-board controller 5 and the individual server 3 are configured as separate units, the on-board controller 5 only needs to perform the vehicle control processing similarly to the above embodiment, therefore the vehicle control processing does not delay.

Further, the artificial intelligence technology is currently in a developing stage and the progression speed is high. Therefore, in this modification, the separately-configured individual server 3 is easily updatable to a higher performance server.

Next, effects of the vehicle drive assistance system of this embodiment are described.

The vehicle drive assistance system of this embodiment includes the shared server 1 (executing the general driver model learning engine) configured to build the general driver model Ma to be applied for a plurality of vehicle drivers based on the driving data of the plurality of drivers, the individual server 3 (executing the individual driver model learning engine) configured to build the individual driver model Mb unique to the specific driver based on the driving data of the specific driver, and the on-board controller 5 provided in the vehicle A of the driver and configured to perform particular vehicle control processing. The individual server 3 includes the parameter update engine 32 (executing the vehicle control updating program) configured to cause the on-board controller 5 to update the vehicle control processing based on the general driver model Ma and the individual driver model Mb. The parameter update engine 32 acquires the general driver model Ma and the individual driver model Mb and, according to a given condition, determines a driver model based on which the vehicle control processing is updated, between the general driver model Ma and the individual driver model Mb.

In this embodiment, a suitable model is selected from the general driver model Ma and the individual driver model Mb according to the given condition, and the vehicle control processing which is performed in the vehicle A is updated based on the selected model. The individual driver model Mb is built based on the driving data of the vehicle A, on the other hand, the general driver model Ma is built based on the driving data of the plurality of drivers. Therefore, by selecting one of the general driver model Ma and the individual driver model Mb according to the suitable condition, the vehicle control processing is updated more suitably.

Further, in this embodiment, the parameter update engine 32 determines a difference between the general driver model Ma and the individual driver model Mb, and when the difference is above a given threshold, the vehicle control processing is updated based on the general driver model Ma. This is because, when the difference is above the given threshold, there is a possibility of the individual driver model Mb being generated due to the repeated extreme driving operation. Thus, a risk of safety decrease of the vehicle A is reduced.

Further, in this embodiment, the individual server 3 includes the driver state analyzing program (parameter update engine 32) configured to analyze the current state of the driver based on the driving data of the specific driver. When the driver state analyzed by the driver state analyzing unit is not changed to a given improved state after the vehicle control processing is updated based on the individual driver model Mb, the parameter update engine 32 updates the vehicle control processing based on the general driver model Ma. In this embodiment, although the vehicle control processing is updated based on the individual driver model Mb, if the driver state is not improved (e.g., the emotional state is not changed from tensed to relaxed), the vehicle control processing is updated again based on the general driver model Ma.

Further, in this embodiment, the parameter update engine 32 prioritizes the update of the vehicle control processing based on the individual driver model Mb than the update of the vehicle control processing based on the general driver model Ma. This is because, since the individual driver model Mb reflects the characteristics of the specific driver more than the general driver model Ma, the vehicle control processing is preferable to be updated according to the individual driver model Mb.

Moreover, in this embodiment, the method of assisting driving of the vehicle by the vehicle drive assistance system is provided. The vehicle drive assistance system includes the shared server 1 (executing the general driver model learning engine) configured to build the general driver model Ma configured to be applied for a plurality of drivers based on the driving data of the plurality of drivers, the individual server 3 (executing the individual driver model learning engine) configured to build the individual driver model Mb unique to the specific driver based on the driving data of the driver, and the on-board controller 5 provided in the vehicle A of the specific driver and configured to perform particular vehicle control processing. The method includes causing the individual server 3 to acquire the general driver model Ma from the shared server 1, causing the individual server 3 to acquire the control parameter P of the vehicle control processing from the on-board controller 5, causing the individual server 3 to acquire the individual driver model parameter corresponding to the acquired control parameter P from the individual driver model Mb, causing the individual server 3 to acquire the general driver model parameter corresponding to the acquired control parameter P from the general driver model Ma, causing the individual server 3 to calculate the difference between the individual driver model parameter and the general driver model parameter, causing the individual server 3 to calculate the update parameter for the control parameter P based on the individual driver model parameter when the difference is smaller than the given value, causing the individual server 3 to calculate the update parameter for the control parameter P based on the general driver model parameter when the difference is larger than the given value, and causing the individual server 3 to transmit to the on-board controller 5 the instruction for updating the control parameter P to the update parameter.

Moreover, in this embodiment, the method of assisting driving of the vehicle by the vehicle drive assistance system is provided. The vehicle drive assistance system includes the shared server 1 (executing the general driver model learning engine) configured to build the general driver model Ma configured to be applied for a plurality of drivers based on the driving data of the plurality of drivers, the individual server 3 (executing the individual driver model learning engine) configured to build the individual driver model Mb unique to the specific driver based on the driving data of the driver, and the on-board controller 5 provided in the vehicle A of the specific driver and configured to perform particular vehicle control processing. The method includes causing the driver state analyzing unit to analyze the current emotional state of the driver based on the driving data of the specific driver, causing the individual server 3 to acquire the control parameter P of the vehicle control processing from the on-board controller 5, causing the individual server 3 to acquire the individual driver model parameter corresponding to the acquired control parameter P from the individual driver model Mb, causing the individual server 3 to calculate the update parameter for the control parameter P based on the individual driver model parameter, causing the individual server 3 to transmit to the on-board controller 5 the instruction for updating the control parameter P to the update parameter, causing the on-board controller 5 to update the control parameter P to the update parameter, causing the driver state analyzing unit to analyze the emotional state of the driver based on the driving data of the specific driver after the update, causing the individual server 3 to acquire the general driver model parameter corresponding to the updated control parameter from the general driver model Ma when the driver state analyzed by the driver state analyzing unit is not changed to the given state after the update, causing the individual server 3 to calculate the update parameter for the updated control parameter P based on the general driver model parameter, and causing the individual server 3 to transmit to the on-board controller 5 the instruction for updating the updated control parameter P to the update parameter calculated based on the general driver model parameter.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Shared Server
3 Individual Server

5 On-board Controller
8 Vehicle Sensor
9a Information Presentation Device
9b On-board Device
9c Information Communication Device
9d Vehicle Control System
11, 31 Learning Engine
32 Parameter Update Engine
33 Recommendation Engine
33a State Analysis Block
33b Recommendation Block
34 Difference Analysis Engine
35 Result Verification Engine
40 First Synchronization Engine
51 Vehicle Control Block
51a Current State Analysis Block
51b Ideal State Analysis Block
51c Difference Calculation Block
52a Entertainment Control Block
52b Safety Control Block
53 Recommendation Determination Block
60 Second Synchronization Engine
A Vehicle
Da, Db Accumulated Data
Ma General Driver Model
Mb Individual Driver Model
Mi Ideal Driver Model
P Control Parameter
S, S2 Vehicle Drive Assistance System

What is claimed is:

1. A vehicle drive assistance system, comprising one or more processors configured to execute:
  a general driver model learning engine configured to build a general driver model to be applied to a plurality of vehicle drivers based on driving data of the plurality of drivers; and
  an individual driver model learning engine configured to build an individual driver model unique to a specific vehicle driver based on driving data of the specific driver; and
  an on-board controller provided in a vehicle operated by the specific driver and configured to perform a particular vehicle control processing,
  wherein the individual driver model learning engine includes a vehicle control updating program configured to cause the on-board controller to update the vehicle control processing based on the general driver model and the individual driver model,
  wherein the vehicle control updating program acquires the general driver model and the individual driver model and, according to a given condition, determines a driver model based on which the vehicle control processing is updated, between the general driver model and the individual driver model,
  wherein the individual driver model learning engine includes a driver state analyzing program configured to analyze a current state of the specific driver based on the driving data of the specific driver, and
  wherein when the driver state analyzed by the driver state analyzing program is not changed to a given state after the vehicle control processing is updated based on the individual driver model, the vehicle control updating program updates the vehicle control processing based on the general driver model.

2. The vehicle drive assistance system of claim 1, wherein the vehicle control updating program determines a difference between the general driver model and the individual driver model, and when the difference is above a given threshold, the vehicle control processing is updated based on the general driver model.

3. The vehicle drive assistance system of claim 1, wherein the vehicle control updating program prioritizes the update of the vehicle control processing based on the individual driver model than the update of the vehicle control processing based on the general driver model.

4. A method of assisting driving of a vehicle by a vehicle drive assistance system including one or more processors configured to execute a general driver model learning engine configured to build a general driver model to be applied for a plurality of vehicle drivers based on driving data of the plurality of drivers, and an individual driver model learning engine configured to learn an individual driver model unique to a specific vehicle driver based on driving data of the specific driver, and an on-board controller provided in a vehicle operated by the specific driver and configured to program particular vehicle control processing, the method comprising causing the individual driver model learning engine to:
  acquire the general driver model from the general driver model learning engine;
  acquire a control parameter of the vehicle control processing from the on-board controller;
  acquire from the individual driver model an individual driver model parameter corresponding to the acquired control parameter;
  acquire from the general driver model a general driver model parameter corresponding to the acquired control parameter;
  calculate a difference between the individual driver model parameter and the general driver model parameter;
  calculate an update parameter for the control parameter based on the individual driver model parameter when the difference is smaller than a given value;
  calculate an update parameter for the control parameter based on the general driver model parameter when the difference is larger than the given value;
  transmit to the on-board controller an instruction for updating the control parameter to the update parameter;
  execute a driver state analyzing program to analyze a current state of the specific driver based on the driving data of the specific driver; and
  when the driver state analyzed by the driver state analyzing program is not changed to a given state after the vehicle control processing is updated based on the individual driver model, updating the vehicle control processing based on the general driver model.

5. A method of assisting driving of a vehicle by a vehicle drive assistance system including one or more processors configured to execute a general driver model learning engine configured to build a general driver model to be applied for a plurality of vehicle drivers based on driving data of the plurality of drivers, and an individual driver model learning engine configured to build an individual driver model unique to a specific vehicle driver based on driving data of the specific driver, and an on-board controller provided in a vehicle operated by the specific driver and configured to execute a particular vehicle control processing, the method comprising:
  causing a driver state analyzing program to analyze a current emotional state of the driver based on the driving data of the specific driver;
  causing the individual driver model learning engine to acquire a control parameter of the vehicle control processing from the on-board controller;

causing the individual driver model learning engine to acquire from the individual driver model an individual driver model parameter corresponding to the acquired control parameter;

causing the individual driver model learning engine to calculate an update parameter for the control parameter based on the individual driver model parameter;

causing the individual driver model learning engine to transmit to the on-board controller an instruction for updating the control parameter to the update parameter;

causing the on-board controller to update the control parameter to the update parameter;

causing the driver state analyzing unit to analyze the emotional state of the driver based on the driving data of the specific driver after the update;

causing the individual driver model learning engine to acquire a general driver model parameter corresponding to the updated control parameter from the general driver model when the driver emotional state analyzed by the driver state analyzing program is not changed to a given state after the update;

causing the individual driver model learning engine to calculate an update parameter for the updated control parameter based on the general driver model parameter; and causing the individual driver model learning engine to transmit to the on-board controller an instruction for updating the updated control parameter to the update parameter calculated based on the general driver model parameter.

* * * * *